United States Patent
Tin et al.

(10) Patent No.: US 11,442,148 B2
(45) Date of Patent: Sep. 13, 2022

(54) HIGH TEMPERATURE AND HIGH DYNAMIC BANDWIDTH PHOTONIC SENSOR FOR GAS FLOW RATE, TEMPERATURE, AND PRESSURE MEASUREMENT

(71) Applicant: Honeywell International Inc., Morris Plains, NJ (US)

(72) Inventors: Steven Tin, Edina, MN (US); Chad Fertig, Bloomington, MN (US); Matthew Wade Puckett, Scottsdale, AZ (US); Neil A. Krueger, Saint Paul, MN (US); Jianfeng Wu, Tucson, AZ (US)

(73) Assignee: Honeywell International Inc., Charlotte, NC (US)

( * ) Notice: Subject to any disclaimer, the term of this patent is extended or adjusted under 35 U.S.C. 154(b) by 551 days.

(21) Appl. No.: 16/569,581

(22) Filed: Sep. 12, 2019

(65) Prior Publication Data
US 2021/0080549 A1   Mar. 18, 2021

(51) Int. Cl.
*G01K 11/3206*   (2021.01)
*G01D 3/036*   (2006.01)
(Continued)

(52) U.S. Cl.
CPC ........... *G01S 7/4816* (2013.01); *G01S 7/4811* (2013.01); *G01S 7/4818* (2013.01); *G01S 17/10* (2013.01);
(Continued)

(58) Field of Classification Search
CPC .................... G01D 3/0365; G01K 11/3206
See application file for complete search history.

(56) References Cited

U.S. PATENT DOCUMENTS 5,667,304 A * 9/1997 Gelbwachs ............ G01K 11/20
374/161
8,727,613 B2   5/2014 Mihailov
(Continued)

FOREIGN PATENT DOCUMENTS

CN   202177385 U   3/2012
CN   110383036 A * 10/2019 ......... G01N 15/1404
(Continued)

OTHER PUBLICATIONS

Chai et al., "Review on fiber-optic sensing in health monitoring of power grids", Optical Engineering 58(7), Jul. 2019, pp. 1-21, SPIE.
(Continued)

*Primary Examiner* — Charlie Y Peng
(74) *Attorney, Agent, or Firm* — Fogg & Powers LLC

(57) ABSTRACT

A sensor system comprises a pulsed light source, and a passive sensor head chip in communication with the light source. The sensor head chip includes a first photonics substrate, a transmitting optical component on the first photonics substrate and configured to couple a pulse, transmitted through a first optical fiber from the light source, into a region of interest; and a receiving optical component on the first photonics substrate and configured to couple backscattered light, received from the region of interest, into a second optical fiber. A signal processing chip communicates with the sensor head chip and light source. The signal processing chip includes a second photonics substrate and comprises a passive optical filter array that receives the backscattered light from the second optical fiber. The filter array includes notch filters in communication with each other and operative for frequency selection; and optical detectors respectively coupled to the notch filters.

20 Claims, 10 Drawing Sheets

(51) Int. Cl.
  *G01S 7/481* (2006.01)
  *G02B 6/42* (2006.01)
  *G02B 6/293* (2006.01)
  *G01S 17/10* (2020.01)

(52) U.S. Cl.
  CPC ..... *G02B 6/29325* (2013.01); *G02B 6/29389* (2013.01); *G02B 6/4215* (2013.01); *G01D 3/0365* (2013.01); *G01K 11/3206* (2013.01)

(56) References Cited

U.S. PATENT DOCUMENTS

| | | | |
|---|---|---|---|
| 9,915,620 B2 | 3/2018 | Uno et al. | |
| 10,247,584 B2 | 4/2019 | Crickmore et al. | |
| 10,309,213 B2 | 6/2019 | Barfoot et al. | |
| 2019/0128731 A1 | 5/2019 | Cedilnik | |
| 2021/0080549 A1* | 3/2021 | Tin | G01S 7/4816 |

FOREIGN PATENT DOCUMENTS

| | | |
|---|---|---|
| KR | 101297286 B1 | 8/2013 |
| KR | 101493985 B1 | 2/2015 |

OTHER PUBLICATIONS

Kher et al., "Distributed, Advanced Fiber Optic Sensors", Applications of Optical Fibers for Sensing, 2019, pp. 1-26, IntechOpen.

Saito et al., "Indication Monitoring Solution by Optical Fiber Temperature Measurement Utilizing AI", Fujitsu Scientific & Technical Journal, Jul. 2018, pp. 16-23, vol. 54, No. 3, Software Technologies to Support Digital Innovation.

Stoddart et al., "Fibre optic distributed temperature sensor with an integrated background correction function", Measurement Science and Technology 16, 2005, pp. 1299-1304, Institute of Physics Publishing.

Tin et al. "High Resolution and High Efficiency Photonic Air Data Detection", U.S. Appl. No. 16/569,555, filed Sep. 12, 2019; pp. 1-34.

* cited by examiner

HIGH TEMPERATURE AND HIGH DYNAMIC BANDWIDTH PHOTONIC SENSOR FOR GAS FLOW RATE, TEMPERATURE, AND PRESSURE MEASUREMENT

BACKGROUND

Many aerospace applications require sensing (e.g., pressure, flow rate, temperature, etc.) in high-temperature environments, such as sensing in the hot zones of internal combustion and turbine engines as well as in other related applications. Current sensing solutions are limited, with most systems making indirect measurements with limited accuracy and high latency, while extrapolating or providing cooling at the cost of significant infrastructure, weight, and power.

There is a need for enabling accurate and low-latency measurements in hot zones, which would enhance performance of many aerospace applications, including engine systems, by enabling closed-loop controls and critical parameter monitoring.

SUMMARY

A sensor system comprises a pulsed light source operative to emit light pulses at a selected wavelength, and a passive sensor head chip in optical communication with the pulsed light source. The passive sensor head chip includes a first photonics substrate and comprises a transmitting optical component on the first photonics substrate optically coupled to a first optical fiber, the transmitting optical component configured to couple a light pulse, transmitted through the first optical fiber from the pulsed light source, into a region of interest; and a receiving optical component on the first photonics substrate optically coupled to a second optical fiber, the receiving optical component configured to couple backscattered light, received from the region of interest, into the second optical fiber. A signal processing chip is in optical communication with the passive sensor head chip and the pulsed light source. The signal processing chip includes a second photonics substrate and comprises a passive optical filter array on the second photonics substrate. The passive optical filter array is configured to receive the backscattered light from the second optical fiber and a reference pulse from the pulsed light source. The passive optical filter array includes a plurality of optical notch filters in optical communication with each other, the optical notch filters operative for frequency selection; and a plurality of optical detectors each respectively coupled to an output of one of the optical notch filters. The passive optical filter array is operative to perform frequency spectrum decomposition of the received backscattered light into a plurality of signals used for data extraction and processing to determine one or more parameters of a gas in the region of interest.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
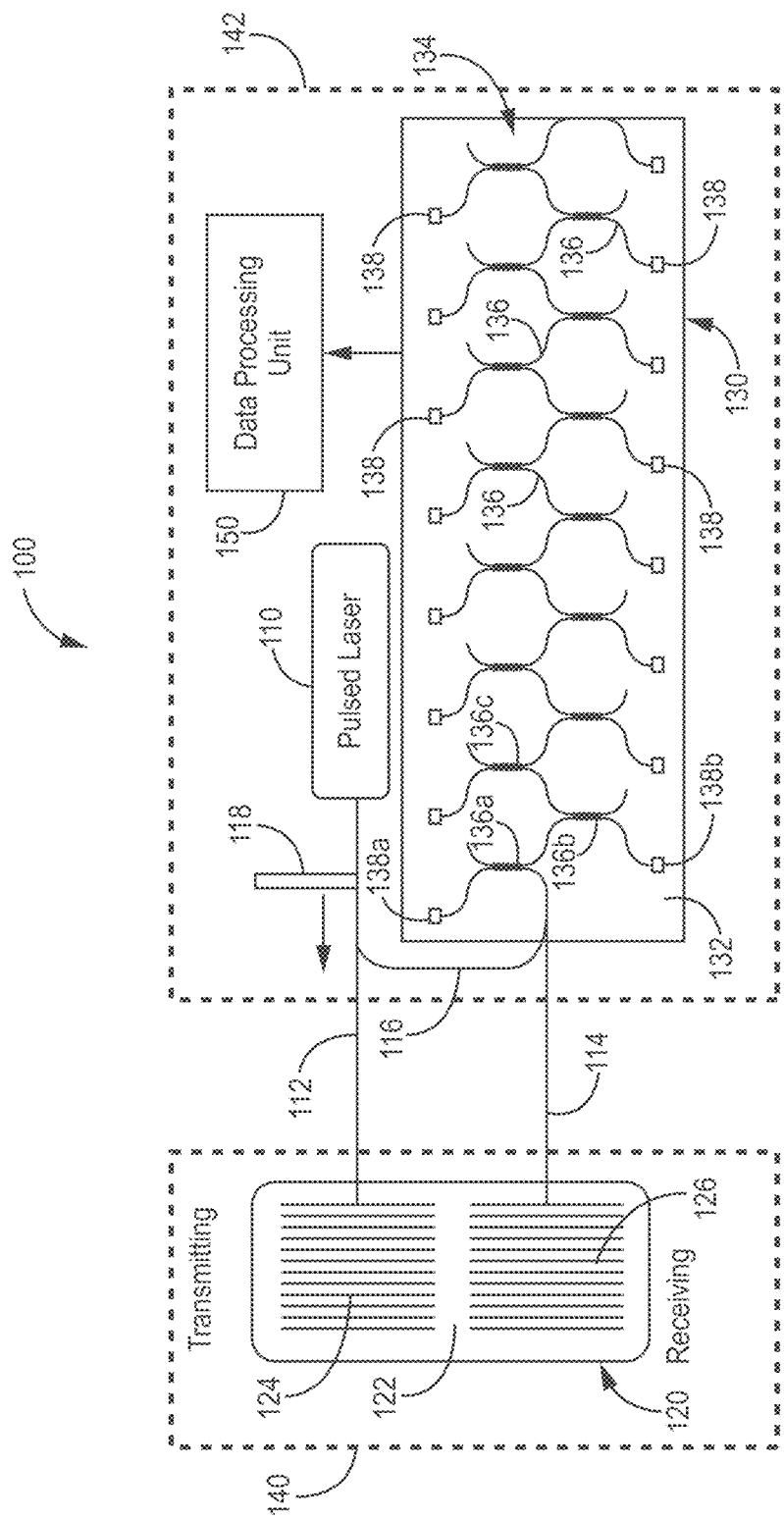
FIG. 1 is a schematic illustration of a sensor system, according to one embodiment, which can be implemented for measuring gas temperature, pressure, and flow rate in high temperature environments.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Sensor systems for measuring gas flow rate, temperature, and pressure are described herein. In exemplary embodiments, sensor systems can be implemented with high temperature and high dynamic bandwidth integrated photonics sensors, such as with silicon photonics (SiP) sensors, in Light Detection and Ranging (LIDAR) systems.

In one embodiment, the sensors are separated into a high-temperature, passive sensor head for operation in a "hot zone" environment, and an optical signal processing back-end for operation in a "cold zone" environment. Optical fibers, which are robust, lightweight, and have high-temperature stability, can be used for signal transmission between the hot zone and cold zone environments with latencies as low as a few nanoseconds.

During operation, a temporally-defined laser pulse is transmitted into the hot zone environment (e.g., an engine flow path) via a first grating coupler on the passive sensor head, and back-scattered light from the hot zone environment is received at an adjacent second grating coupler. The backscattered light is then sent to a passive optical filter array with optical detectors for frequency spectrum decomposition. The system then extracts information related to pressure, flow rate, and temperature in the region of interest In some embodiments, the optical filter array can be designed with overlapping pass bands to cover the entire relevant frequency spectrum with optimized bandwidth for data extraction.

The use of optical sensing in the present systems have many advantages, including a lack of electromagnetic interference, high-temperature stability, enhanced remote sensing, and a potential for advanced wavelength- and mode-sensitive routing. The present sensor systems provide a low size, weight, and power (SWAP) solution for high dynamic bandwidth, low latency, and high accuracy measurements of flow rate, gas pressure, and temperature, in high temperature environments. For example, the sensor systems can provide higher accuracy measurements in higher temperature environments of up to about 1200° C.

In some embodiments, a passive sensor of the sensor systems can operate at up to about 1200° C., while a standoff detection region can operate at greater than about 2000° C. In other embodiments, the sensor systems can operate at normal temperature ranges of about −40° C. to about 85° C. for pulsed LIDAR applications.

The various components of the sensor systems described herein can be formed using standard micro-fabrication techniques, such as employed in the manufacture of photonics devices. It should be understood that the number of optical notch filters and corresponding optical detectors formed on an optical filter array can be varied, depending on the application desired and the design parameters required.

Further details of various embodiments are described hereafter with reference to the drawings.

FIG. 1 illustrates a sensor system 100, according to one embodiment, which can be implemented for measuring gas temperature, pressure, and flow rate in higher temperature environments. The sensor system 100 generally includes a pulsed light source such as pulsed laser 110, a passive photonics sensor head chip 120 in optical communication with pulsed light source 110, and a photonics signal processing chip 130 in optical communication with sensor head chip 120. In one embodiment, sensor system 100 can be implemented as a high temperature standoff silicon photonics (SiP) flow path dynamic LiDAR system.

The pulsed laser 110 is operative to emit light pulses at a selected wavelength. A first optical fiber 112 provides optical communication between pulsed laser 110 and sensor head chip 120. The sensor head chip 120 is configured to be located in a "hot zone" of a region of interest 140. The hot zone of region of interest 140 can include temperatures up to about 2000° C. The sensor head chip 120 includes a first photonics substrate 122, such as an SiP substrate. A transmitting optical component such as a first grating coupler 124, and a receiving optical component such as a second grating coupler 126, are located on photonics substrate 122. The first grating coupler 124 and second grating coupler 126 can be implemented as SiP grating couplers.

The first grating coupler 124 is configured to couple a light pulse 118, transmitted through first optical fiber 112 from pulsed laser 110, into the hot zone of region of interest 140 where sensor head chip 120 is located. The second grating coupler 126 is configured to couple backscattered light, received from region of interest 140, into a second optical fiber 114, which is in optical communication with photonics signal processing chip 130.

Exemplary optical fibers that can be utilized in sensor system 100 include high temperature glass fibers and sapphire fibers (which can be used at about 1200° C. or higher). To make sure the fiber to waveguide attachments on the sensor chips can survive high temperatures, fusion splicing can be used to ensure a permanent connection.

The signal processing chip 130 is configured to be located in a "cold zone" region 142 that is located away from the hot zone of region of interest 140. The cold zone region 142 can include temperature ranges of about −40° C. to about 300° C. The signal processing chip 130 includes a second photonics substrate 132, such as a SiP substrate. A passive optical filter array 134 is located on photonics substrate 132. The optical filter array 134 is configured to receive the backscattered light from second optical fiber 114, and a reference light pulse from pulsed laser 110, such as through a third optical fiber 116 coupled between first optical fiber 112 and second optical fiber 114.

The optical filter array 134 includes a plurality of optical notch filters 136 in optical communication with each other. A plurality of optical detectors 138 are each respectively coupled to outputs of optical notch filters 134. The optical notch filters 136 are operative for frequency selection such that each notch filter passes a selected frequency from a frequency spectrum to a respective one of optical detectors 138. Further details with respect to the notch filters are described hereafter.

The optical filter array 134 is operative to perform passive frequency spectrum decomposition of the received backscattered light into a plurality of signals, which are used for data extraction by a data processing unit 150, such as a data processing integrated circuit, coupled to an output of signal processing chip 130.

During operation of optical filter array 134, pulsed laser 110 emits light pulse 118, which is transmitted through optical fiber 112 to sensor head chip 120, where first grating coupler 124 couples light pulse 118 into the hot zone of region of interest 140. A portion of light pulse 118 is directed as a reference pulse by third optical fiber 116 to signal processing chip 130. The reference pulse is coupled onto signal processing chip 130 to provide a reference for Doppler shift. The backscattered light from region of interest 140 is received by second grating coupler 126, which couples the backscattered light into second optical fiber 114, which in turn sends the backscattered light to signal processing chip 130.

The coupled backscattered light and the reference pulse are directed, such as by a waveguide, to an input port of a first notch filter 136a of optical filter array 134. A selected first frequency is passed through a drop port of first notch filter 136a to a first detector 138a, and the remaining frequencies are reflected through a reflection port of first notch filter 136a to an input port of a second notch filter 136b. A selected second frequency is passed through a drop port of second notch filter 136b to a second detector 138b, and the remaining frequencies are reflected through a reflection port of second notch filter 136b to an input port of a third notch filter 136c. This filtering process continues until all of the notch filters have passed respective selected frequencies to their respective detectors. In this way, optical filter array 134 performs a passive frequency spectrum decomposition of the backscattered light into a plurality of output signals, which are used for data extraction and processing by data processing unit 150 to determine one or more parameters of a gas in region of interest 140.

Figure 2:
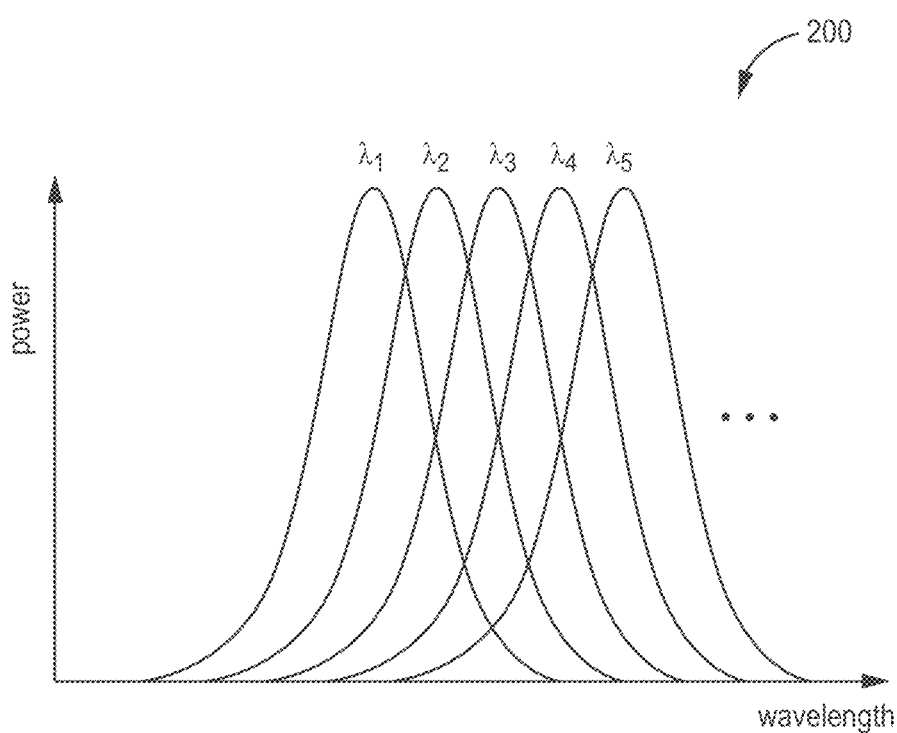
FIG. 2 is a graphical representation of the simulated performance of a filter array of optical notch filters, showing the filter array pass bands.

FIG. 2 is a graphical representation 200 of the simulated performance of an exemplary passive optical filter array of optical notch filters, showing the filter array pass bands. To maximize photon collection efficiency and accuracy, the optical filter array can be configured such that the pass bands ($\lambda_1$ to $\lambda_5$) of the optical notch filters overlap with each other, as shown in FIG. 2.

Figure 3A:
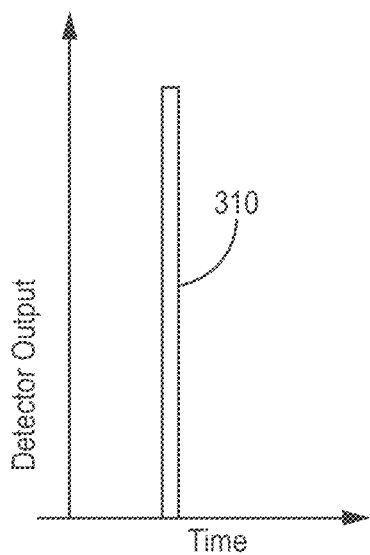
FIGS. 3A and 3B are graphical representations of detected signals that can be obtained by the sensor system of FIG. 1.
Figure 3B:
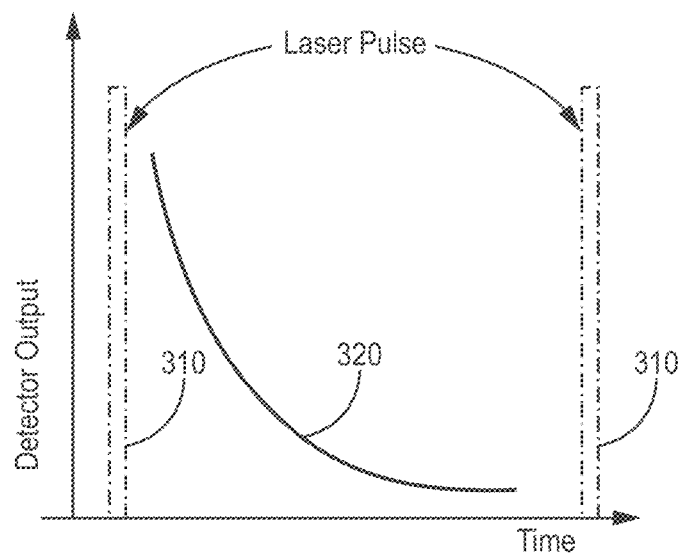
Figure 4:
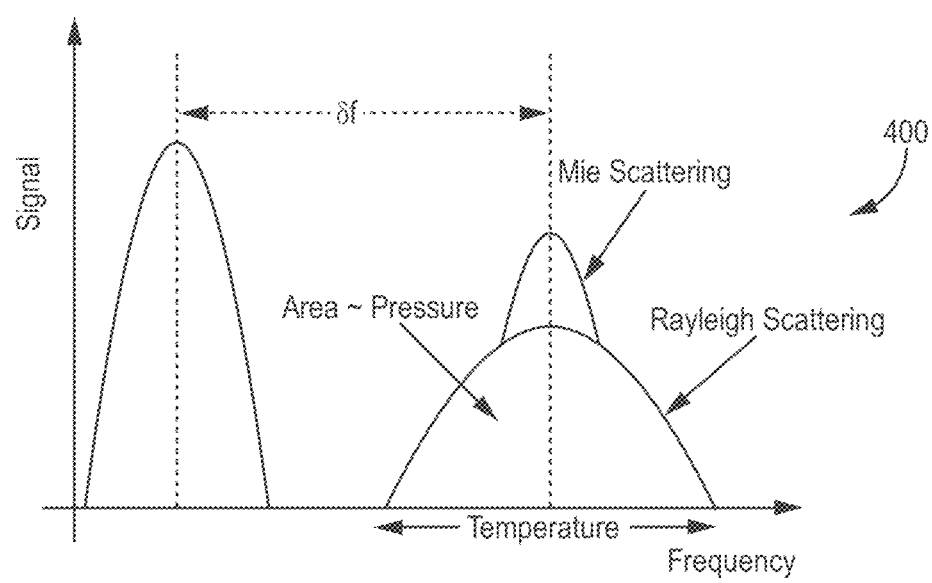
FIG. 4 is a graphical representation of the measurements that can be obtained from the sensor system of FIG. 1.

FIGS. 3A-3B and 4 are graphical representations of the detected signals that can be obtained by sensor system 100 (FIG. 1), such as a high temperature standoff SiP flow path dynamic LiDAR system. FIGS. 3A and 3B show the detector output with respect to time. In particular, the detector output overlapping with input and backscattered optical frequencies are shown respectively in FIGS. 3A and 3B. The received backscattered light 320 (FIG. 3B) decreases as a laser pulse 310 moves away from the laser transmitter over time.

FIG. 4 is a graphical representation 400 showing the detected signals with respect to frequency for the laser and scattering signals detected by sensor system 100. FIG. 4 depicts the measurements that can be obtained from the detected signals, which include environmental information extracted from the backscattered light. The backscattered light detected by the optical filter array can include backscattered light from large particles (Mie Scattering) and small gas molecules (Rayleigh Scattering), which carry information about gas flow speed (Doppler shift, $\delta f$), gas temperature, and gas pressure (area under the Rayleigh Scattering curve).

The signals from all the detectors at any given time can reconstruct the data representations shown in FIG. 4, corresponding to the air data at a given time and spatial location along the laser transmission path. The optical filter array can be designed to cover the entire relevant frequency spectrum with optimized bandwidth for data extraction. The spatial resolution can be optimized with a laser pulse width.

The detection bandwidth can be greater than about 10 MHz since the optical round-trip time is less than about 100 ns. With standoff detection, the point of detection along the flow path can have a temperature greater than about 2000° C., with passive optical notch filters used for frequency selection and optical spectrum decomposition.

Figure 5:
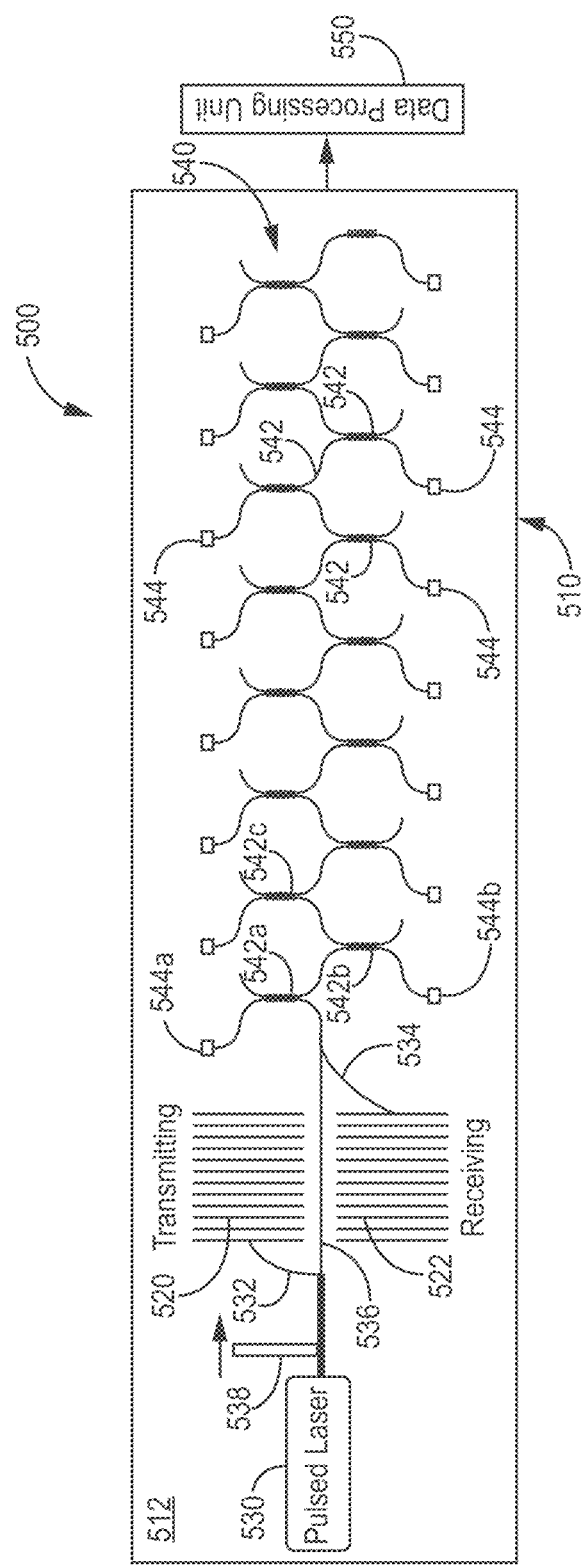
FIG. 5 is a schematic illustration of a sensor system, according to another embodiment, which can be implemented for measuring gas temperature, pressure, and flow rate in low temperature environments.

FIG. 5 illustrates a sensor system 500, according to another embodiment, which can be implemented for measuring gas temperature, pressure, and flow rate in lower temperature environments. For example, sensor system 500 can be used for pulsed LiDAR applications that do not require high temperature operation. In one embodiment, sensor system 500 can be implemented as a standoff SiP flow path dynamic LiDAR system for low temperature applications As shown in FIG. 5, various components of sensor system 500 can be integrated onto a single photonics chip 510, which is operative for optical signal transmission, detection, and processing. The photonics chip 510 includes a photonics substrate 512, such as a SiP substrate. A first grating coupler 520 and a second grating coupler 522 are located on photonics substrate 512. The first grating coupler 520 and second grating coupler 522 can be formed as SiP grating couplers. A pulsed laser 530 is located on photonics substrate 512 and is operative to emit light pulses at a selected wavelength. A first waveguide 532 on photonics substrate 512 provides optical communication between pulsed laser 530 and first grating coupler 520.

The first grating coupler 520 is configured to couple a light pulse 538, transmitted through first waveguide 532 from pulsed laser 530, into a region of interest near where photonics chip 510 is located. The second grating coupler 522 is configured to couple backscattered light, received from the region of interest, into a second waveguide 534.

A passive optical filter array 540 is located on photonics substrate 512 and is configured to receive the backscattered light from second waveguide 534, and a reference light pulse from pulsed laser device 530, such as through a third waveguide 536 on photonics substrate 512. The passive optical filter array 540 includes a plurality of optical notch filters 542 in optical communication with each other. A plurality of optical detectors 544 are each respectively coupled to outputs of optical notch filters 542. The optical notch filters 542 are operative for frequency selection such that each notch filter passes a selected frequency from a frequency spectrum to a respective one of optical detectors 544.

The passive optical filter array 540 is operative to perform passive frequency spectrum decomposition of the received backscattered light into a plurality of signals, which are used for data extraction by a data processing unit 550, such as a data processing integrated circuit, coupled to an output of photonics chip 510.

During operation optical filter array 540, pulsed laser 530 emits light pulse 538, which is transmitted through first waveguide 532 to first grating coupler 520, which couples light pulse 538 into the region of interest. A portion of light pulse 538 is directed as a reference pulse by third waveguide 536 to optical filter array 540. The reference pulse is used to provide a reference for Doppler shift. The backscattered light from the region of interest is received by second grating coupler 522, which couples the backscattered light into second waveguide 534, which in turn directs the backscattered light to optical filter array 540.

The backscattered light and the reference pulse are then directed to an input port of a first notch filter 542a of optical filter array 540. A selected first frequency is passed through a drop port of first notch filter 542a to a first detector 544a, and the remaining frequencies are reflected through a reflection port of first notch filter 542a to an input port of a second notch filter 542b. A selected second frequency is passed through a drop port of second notch filter 542b to a second detector 544b, and the remaining frequencies are reflected through a reflection port of second notch filter 542b to an input port of a third notch filter 542c. This filtering process continues until all of the notch filters have passed respective selected frequencies to their respective detectors. In this way, optical filter array 540 performs a passive frequency spectrum decomposition of the backscattered light into a plurality of output signals, which are used for data extraction by data processing unit 550.

Figure 6A:
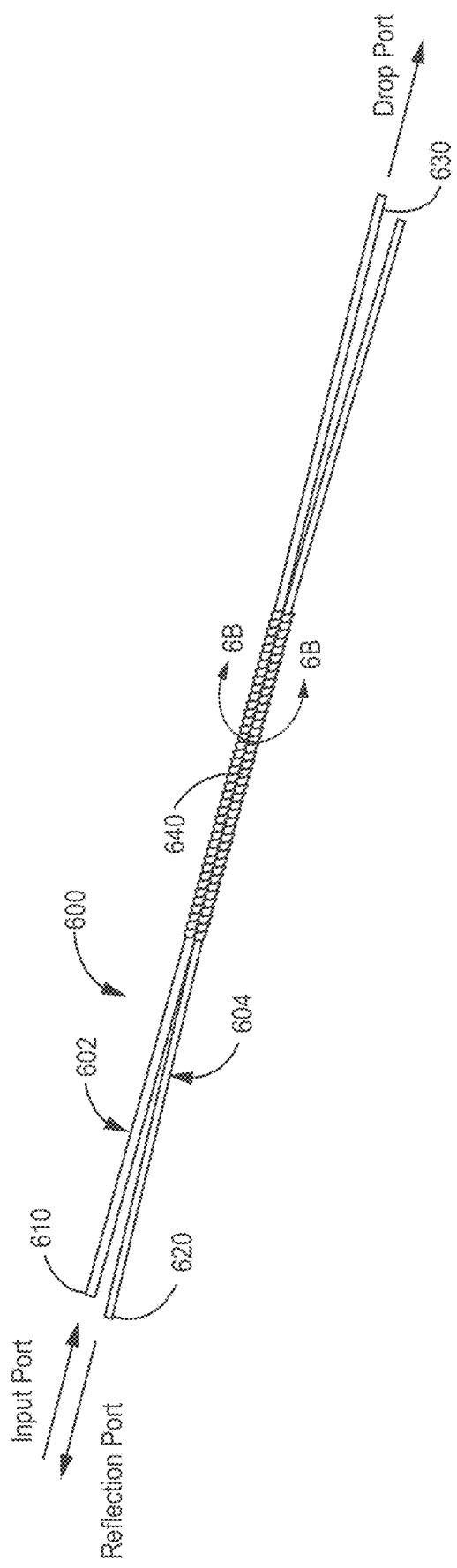
FIG. 6A is a schematic perspective view of an optical notch filter, according to an exemplary embodiment, which can be implemented in an optical filter array of a sensor system.
Figure 6B:
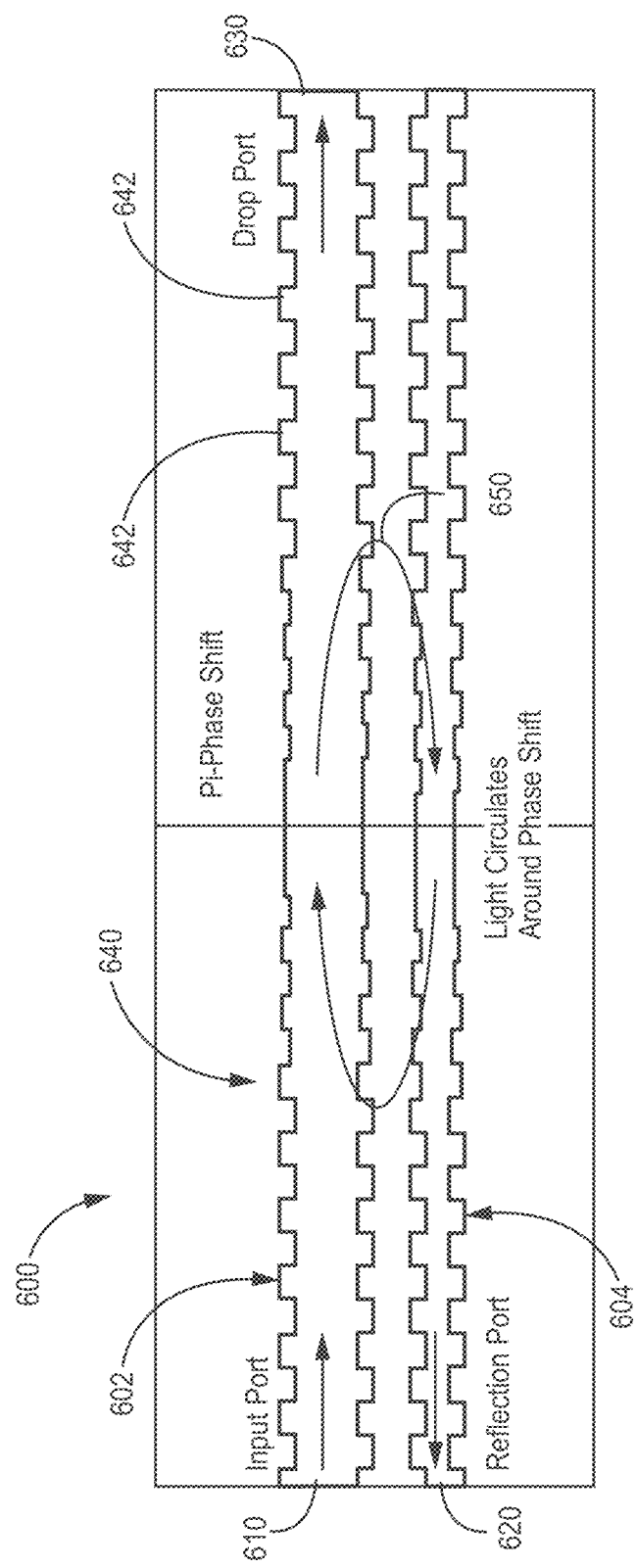
FIG. 6B is an enlarged top view of a portion of the optical notch filter of FIG. 6A.

FIGS. 6A and 6B illustrate the design of an optical notch filter 600, according to an exemplary embodiment, which can be implemented in a passive optical filter array as part of a filter bus for the sensor systems described previously. The optical notch filter 600 comprises a waveguide structure including a first waveguide 602 and a second waveguide 604. An input port 610 is located at a first end of first waveguide 602, a reflection port 620 is located at a first end of second waveguide 604 adjacent to input port 610, and a drop port 630 is located at an opposite second end of first waveguide 602. A grating-assisted directional coupler 640 is located in a central portion of the waveguide structure between input port 610 and drop port 630. The grating-assisted directional coupler 640 has a periodic grating structure 642 on each of first and second waveguides 602, 604, as shown in FIG. 6B. In one embodiment, optical notch filter 600 can be based on a silicon nitride-based design.

The optical notch filter 600 is configured to receive light injected into input port 610, which directs the light to grating-assisted directional coupler 640, which interacts with the light. At the center of the periodic grating structure 642 (FIG. 6B), a pi phase shift in the phase of the modulation employed to create the grating generates a tightly confined light field 650 at the resonance wavelength, with the light circulating around the pi phase shift. A pi phase shift is an abrupt change in the phase of the modulation that defines the grating. If the grating to the left of the shift (x<x_shift) is defined by the function sin(2*pi*x/period), then the grating to the right of the shift (x>x_shift) is defined by the function sin((2*pi*x/period)+pi). In other words, a pi phase shift is an abrupt change in a spatial pattern of the waveguide modulation, such that a periodic structure of the waveguide modulation is shifted in spatial phase by pi radians on either side of an interface.

Figure 6C:
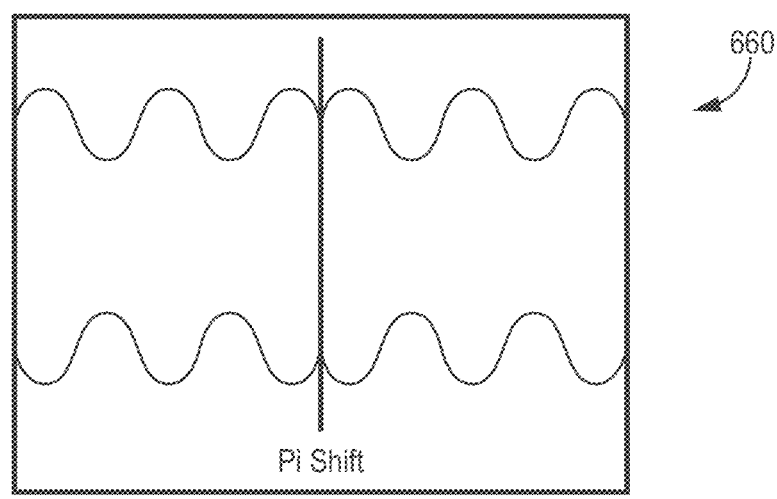
FIG. 6C is an enlarged top view of a pi phase shift design, according to one embodiment, which can be employed in the optical notch filter of FIG. 6A.

One example embodiment of a pi phase shift design 660, which can be employed in notch filter 600, is shown in FIG. 6C. The pi phase shift design 660 allows the selected wavelength of light to be transmitted to drop port 630 (FIG. 6A). All other wavelengths of light exit through reflection port 620 and thus will remain on the filter bus. The resonance wavelength can be modified by changing the period of the grating structure, and the filter bandwidth can be optimized for specific application requirements.

Figure 7:
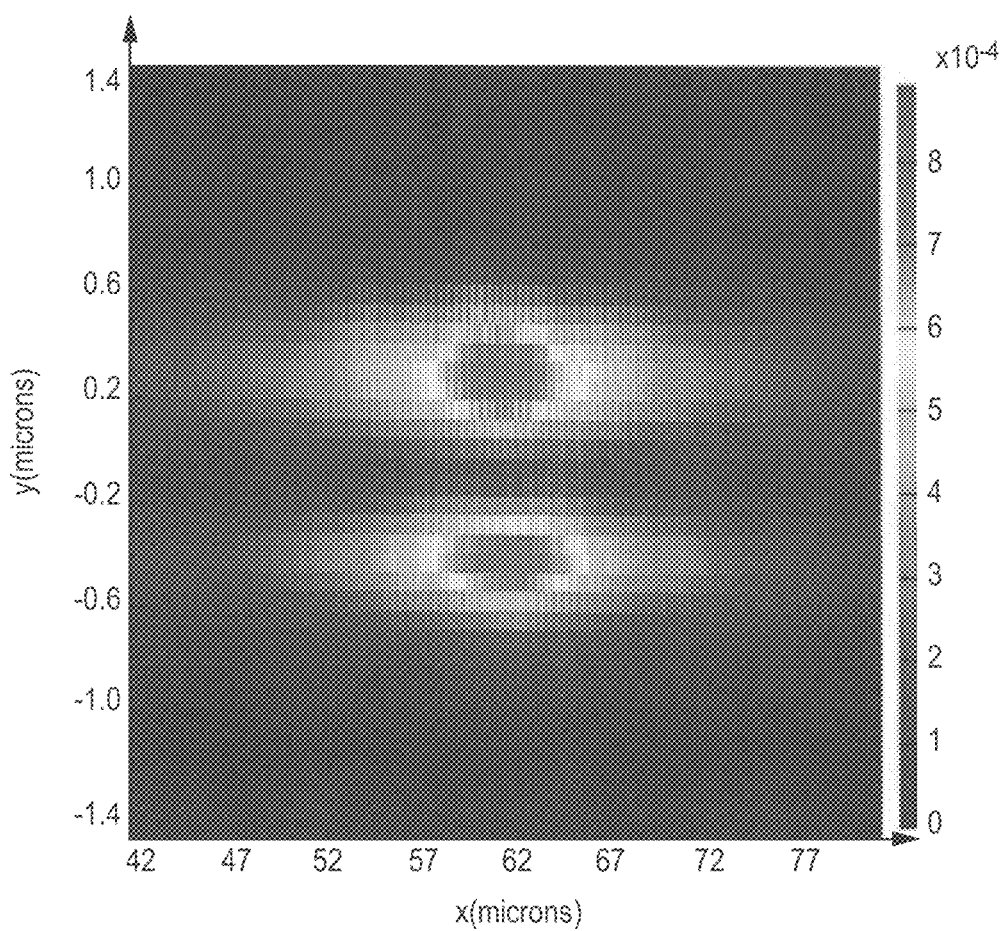
FIG. 7 is a modeled graphical representation of the simulated performance of the optical notch filter of FIG. 6A.

FIG. 7 is a modeled graphical representation of the simulated performance of optical notch filter 600. FIG. 7 shows the electric field which will be generated when light at the resonance frequency is injected into notch filter 600. Under this resonance condition, the light will pass through the notch filter 600.

Figure 8:
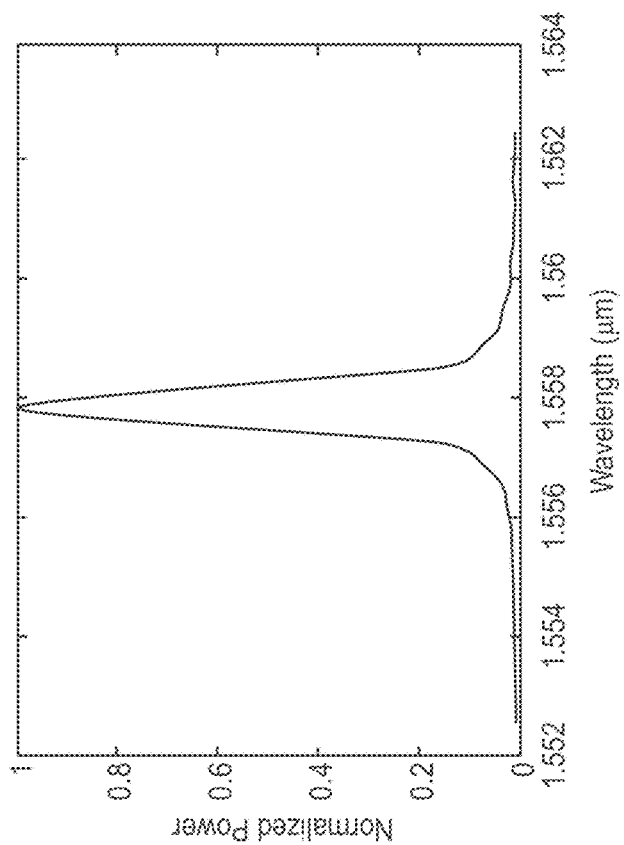
FIG. 8 is a graph of the simulated performance of the optical notch filter of FIG. 6A.

FIG. 8 is a graph of the simulated performance of optical notch filter 600, showing an exemplary transmission spectrum for a simulated resonator of notch filter 600. In particular, FIG. 8 shows the normalized signal power with respect to wavelength for an optical signal that passes through notch filter 600 to a detector. At the desired resonance frequency, the transmission increases to 1, and away from resonance the transmission drops to 0.

Figure 9:
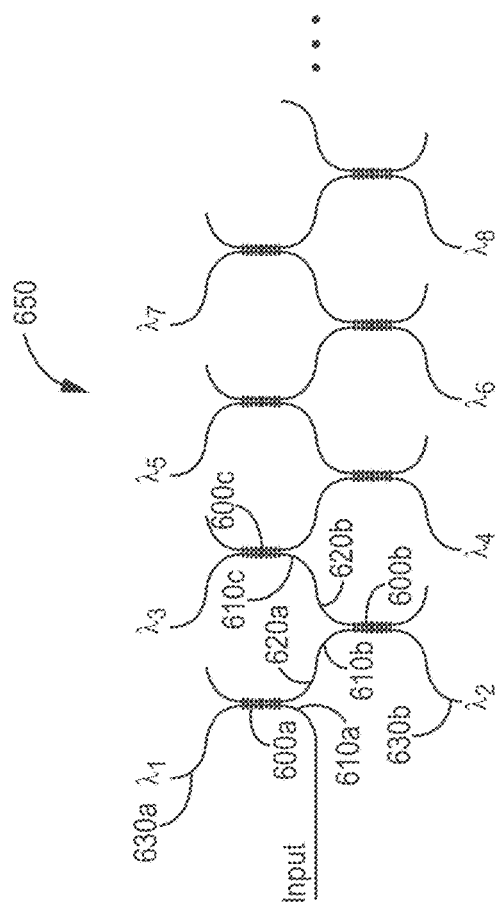
FIG. 9 is a schematic illustration of an array configuration for the optical notch filter of FIG. 6A, according to one implementation.

FIG. 9 illustrates a filter array configuration 650 for optical notch filter 600, according to one implementation. The filter array configuration 650 is arranged such that light is directed from an input of the array to an input port 610*a* of a first notch filter 600*a*. A first frequency ($\lambda_1$) is passed through a drop port 630*a* of first notch filter 600*a*, and the remaining frequencies are reflected through a reflection port 620*a* of first notch filter 600*a* to an input port 610*b* of a second notch filter 600*b*. A second frequency ($\lambda_2$) is passed through a drop port 630*b* of second notch filter 600*b*, and the remaining frequencies are reflected through a reflection port 620*b* of second notch filter 600*b* to an input port 610*c* of a third notch filter 600*c*. This filtering process continues until all of the notch filters have passed the remaining selected frequencies ($\lambda_3$ to $\lambda_8$).

While FIG. 9 shows eight optical notch filters implemented in filter array configuration 650, it should be understood that more or less notch filters can be implemented in a filter array as needed for various applications.

In one embodiment, filter array configuration 650 can be utilized in a passive optical spectrum analyzer. Optical grating couplers can be incorporated to diffract in-plane light from a waveguide out-of-plane and vice versa.

Figure 10:
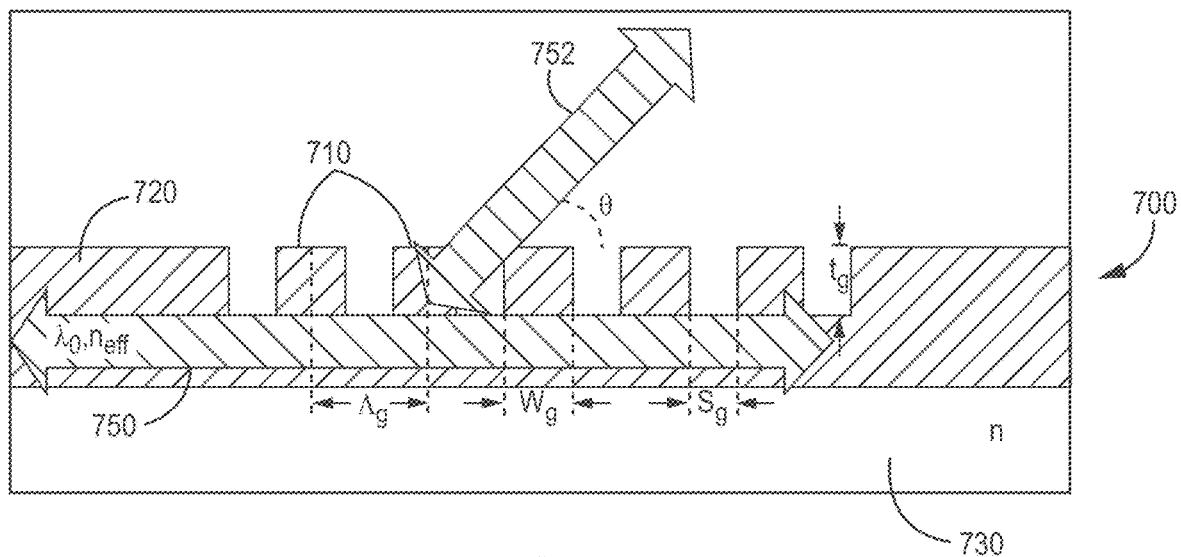
FIG. 10 is a cross-sectional side view of a grating coupler, according to an exemplary embodiment, which can be implemented as part of a sensor system.

FIG. 10 is a cross-sectional side view of a grating coupler 700, such as a SiP grating coupler, which can be utilized in the sensor systems described previously. The grating coupler 700 includes a periodic grating structure 710, which is formed as part of a waveguide layer 720 that is composed of a higher refractive index material. The periodic grating structure 710 and waveguide layer 720 are embedded in a cladding layer 730, which is composed of a lower refractive index material.

FIG. 10 illustrates the design parameters of grating coupler 700, which is based on the following equation:

$$\frac{2\pi n}{\lambda_0}\sin(\theta) = \frac{2\pi n_{eff}}{\lambda_0} - \frac{2\pi}{\Lambda_g}$$

where n is the refractive index of the cladding material, $\lambda_0$ is the wavelength of the input light, $n_{eff}$ is the effective refractive index of the grating material, $\theta$ is the angle of the diffracted light, and $\Lambda_g$ is the spatial period of the grating structure. As further shown in FIG. 10, $w_g$ is the width of a single periodic grating structure, $s_g$ is the space between adjacent periodic grating structures, and $t_g$ is the thickness of each periodic grating structure.

As depicted in FIG. 10, the periodic grating structure 710 is formed to preferentially diffract an input light beam 750 in a direction of interest at a selected angle as a diffracted light beam 752. For a given wavelength, this diffraction angle can cover nearly the entire 180 degree angular space above a chip where grating coupler 700 is located. As a reciprocal device, the grating coupler can additionally receive specific-wavelength light from a given angle of interest. Therefore, for a known wavelength, the angle of incidence can be readily determined. Accordingly, grating coupler 700 can be incorporated into a chip to diffract in-plane light from a waveguide to out-of-plane, or to receive out-of-plane light that is coupled into an in-plane waveguide.

Figure 11:
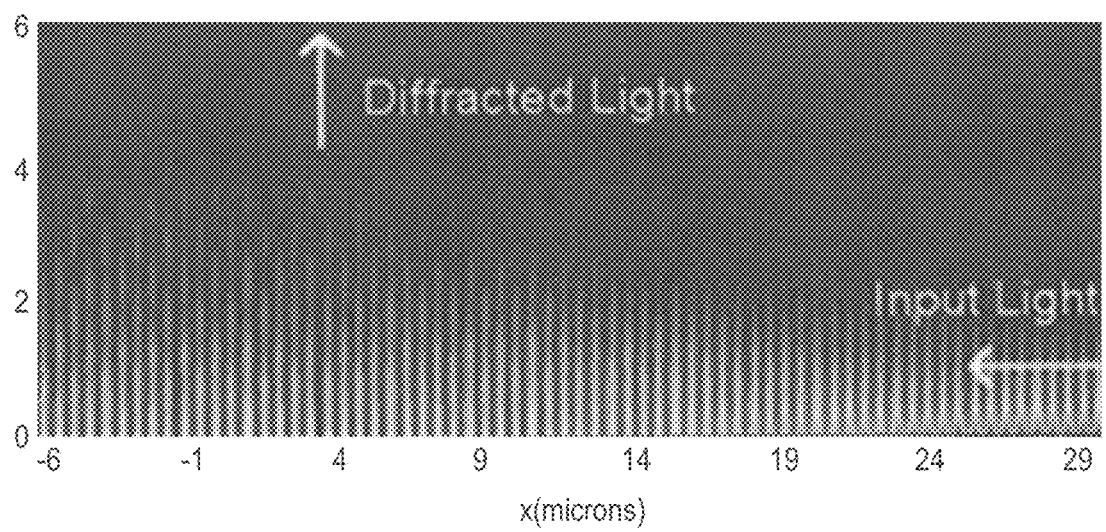
FIG. 11 is a modeled graphical representation of the simulated performance of the grating coupler of FIG. 10.

FIG. 11 is a modeled graphical representation of the simulated performance of grating coupler 700, such as a SiP grating coupler. FIG. 11 shows the input light field propagating along the grating as well as the significantly weaker, diffracted light field. The diffracted light field may become stronger relative to the propagating light field, reducing required grating size, by increasing the grating coefficient. This may in turn be done by increasing the etch depth of the grating.

Example Embodiments

Example 1 includes a sensor system, comprising: a pulsed light source operative to emit light pulses at a selected wavelength; a passive sensor head chip in optical communication with the pulsed light source, the passive sensor head chip including a first photonics substrate and comprising: a transmitting optical component on the first photonics substrate and optically coupled to a first optical fiber, the transmitting optical component configured to couple a light pulse, transmitted through the first optical fiber from the pulsed light source, into a region of interest; and a receiving optical component on the first photonics substrate and optically coupled to a second optical fiber, the receiving optical component configured to couple backscattered light, received from the region of interest, into the second optical fiber; and a signal processing chip in optical communication with the passive sensor head chip and the pulsed light source, the signal processing chip including a second photonics substrate and comprising: a passive optical filter array on the second photonics substrate, the passive optical filter array configured to receive the backscattered light from the second optical fiber and a reference pulse from the pulsed light source, wherein the passive optical filter array includes:

a plurality of optical notch filters in optical communication with each other, the optical notch filters operative for frequency selection; and a plurality of optical detectors each respectively coupled to an output of one of the optical notch filters; wherein the passive optical filter array is operative to perform frequency spectrum decomposition of the received backscattered light into a plurality of signals used for data extraction and processing to determine one or more parameters of a gas in the region of interest.

Example 2 includes the sensor system of Example 1, wherein the pulsed light source comprises a pulsed laser; the transmitting optical component comprises a first grating coupler; and the receiving optical component comprises a second grating coupler.

Example 3 includes the sensor system of any of Examples 1-2, wherein the first and second photonics substrates comprise silicon photonics substrates.

Example 4 includes the sensor system of any of Examples 2-3, wherein the first and second grating couplers comprise silicon photonics grating couplers.

Example 5 includes the sensor system of any of Examples 1-4, wherein the passive sensor head chip is configured to be located in a first higher temperature zone associated with the region of interest; and the signal processing chip is configured to be located in a second lower temperature zone away from the region of interest.

Example 6 includes the sensor system of any of Examples 1-5, wherein the passive optical filter array is configured to receive the reference pulse from a third optical fiber coupled between the first optical fiber and the second optical fiber, wherein the reference pulse provides a reference for Doppler shift.

Example 7 includes the sensor system of any of Examples 1-6, wherein each of the optical notch filters is operative to pass a selected frequency from a frequency spectrum to a respective one of the optical detectors.

Example 8 includes the sensor system of any of Examples 1-7, wherein the optical notch filters each comprise: a waveguide structure including a first waveguide and a second waveguide, the waveguide structure comprising: an input port located at a first end of the first waveguide; a reflection port located at a first end of the second waveguide and adjacent to the input port; a drop port located at an opposite second end of the first waveguide; and a grating-assisted directional coupler located in a central portion of the waveguide structure between the input port and the drop port, the grating-assisted directional coupler including a periodic grating structure on each of the first and second waveguides.

Example 9 includes the sensor system of Example 8, wherein the first waveguide is configured to receive light injected into the input port and direct the light to the grating-assisted directional coupler; and the periodic grating structure of the grating-assisted directional coupler is configured to produce a pi phase shift, which is an abrupt change in a spatial pattern of waveguide modulation, such that a periodic structure of the waveguide modulation is shifted in spatial phase by pi radians on either side of an interface, that generates a confined field of the light at a resonance wavelength, with the light circulating around the pi phase shift; wherein a selected wavelength of the light is transmitted to the drop port, and all other wavelengths of the light exit through the reflection port.

Example 10 includes the sensor system of any of Examples 1-9, further comprising a data processing unit coupled to an output of the signal processing chip, the data processing unit operative to determine the one or more parameters of the gas in the region of interest.

Example 11 includes the sensor system of any of Examples 1-10, wherein the one or more parameters of the gas in the region of interest include gas temperature, gas pressure, or gas flow rate.

Example 12 includes the sensor system of any of Examples 1-11, wherein the sensor system is implemented in a light detection and ranging (LiDAR) sensor system.

Example 13 includes a sensor system, comprising: a sensor chip comprising a photonics substrate; a pulsed light source on the photonics substrate, the pulsed light source operative to emit light pulses at a selected wavelength; a first grating coupler on the photonics substrate and in optical communication with the pulsed light source, the first grating coupler configured to couple a light pulse, transmitted from the pulsed light source, into a region of interest; a second grating coupler on the photonics substrate, the second grating coupler configured to receive backscattered light from the region of interest; and a passive optical filter array on the photonics substrate and in optical communication with the second grating coupler, the passive optical filter array configured to receive the backscattered light from the second grating coupler, and a reference pulse from the pulsed light source, wherein the passive optical filter array comprises: a plurality of optical notch filters in optical communication with each other, the optical notch filters operative for frequency selection; and a plurality of optical detectors each respectively coupled to an output of one of the optical notch filters; wherein the passive optical filter array is operative to perform frequency spectrum decomposition of the received backscattered light into a plurality of signals used for data extraction and processing to determine one or more parameters of a gas in the region of interest.

Example 14 includes the sensor system of Example 13, wherein the pulsed light source comprises a pulsed laser; and the photonics substrate comprises a silicon photonics substrate.

Example 15 includes the sensor system of any of Examples 13-14, wherein each of the optical notch filters is operative to pass a selected frequency from a frequency spectrum to a respective one of the optical detectors.

Example 16 includes the sensor system of any of Examples 13-15, wherein the optical notch filters each comprise: a waveguide structure including a first waveguide and a second waveguide, the waveguide structure comprising: an input port located at a first end of the first waveguide; a reflection port located at a first end of the second waveguide and adjacent to the input port; a drop port located at an opposite second end of the first waveguide; and a grating-assisted directional coupler located in a central portion of the waveguide structure between the input port and the drop port, the grating-assisted directional coupler including a periodic grating structure on each of the first and second waveguides.

Example 17 includes the sensor system of Example 16, wherein the first waveguide is configured to receive light injected into the input port and direct the light to the grating-assisted directional coupler; and the periodic grating structure of the grating-assisted directional coupler is configured to produce a pi phase shift, which is an abrupt change in a spatial pattern of waveguide modulation, such that a periodic structure of the waveguide modulation is shifted in spatial phase by pi radians on either side of an interface, that generates a confined field of the light at a resonance wavelength, with the light circulating around the pi phase shift;

wherein a selected wavelength of the light is transmitted to the drop port, and all other wavelengths of the light exit through the reflection port.

Example 18 includes the sensor system of any of Examples 13-17, further comprising a data processing unit coupled to an output of the sensor chip, the data processing unit operative to determine the one or more parameters of the gas in the region of interest.

Example 19 includes the sensor system of any of Examples 13-18, wherein the one or more parameters of the gas that are determined for the region of interest include gas temperature, gas pressure, or gas flow rate.

Example 20 includes the sensor system of Example 13, wherein the sensor system is implemented in a LiDAR sensor system.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A sensor system, comprising:
   a pulsed light source operative to emit light pulses at a selected wavelength;
   a passive sensor head chip in optical communication with the pulsed light source, the passive sensor head chip including a first photonics substrate and comprising:
     a transmitting optical component on the first photonics substrate and optically coupled to a first optical fiber, the transmitting optical component configured to couple a light pulse, transmitted through the first optical fiber from the pulsed light source, into a region of interest; and
     a receiving optical component on the first photonics substrate and optically coupled to a second optical fiber, the receiving optical component configured to couple backscattered light, received from the region of interest, into the second optical fiber; and
   a signal processing chip in optical communication with the passive sensor head chip and the pulsed light source, the signal processing chip including a second photonics substrate and comprising:
     a passive optical filter array on the second photonics substrate, the passive optical filter array configured to receive the backscattered light from the second optical fiber and a reference pulse from the pulsed light source, wherein the passive optical filter array includes:
       a plurality of optical notch filters in optical communication with each other, the optical notch filters operative for frequency selection; and
       a plurality of optical detectors each respectively coupled to an output of one of the optical notch filters;
   wherein the passive optical filter array is operative to perform frequency spectrum decomposition of the received backscattered light into a plurality of signals used for data extraction and processing to determine one or more parameters of a gas in the region of interest.

2. The sensor system of claim 1, wherein:
   the pulsed light source comprises a pulsed laser;
   the transmitting optical component comprises a first grating coupler; and
   the receiving optical component comprises a second grating coupler.

3. The sensor system of claim 1, wherein the first and second photonics substrates comprise silicon photonics substrates.

4. The sensor system of claim 2, wherein the first and second grating couplers comprise silicon photonics grating couplers.

5. The sensor system of claim 1, wherein:
   the passive sensor head chip is configured to be located in a first higher temperature zone associated with the region of interest; and
   the signal processing chip is configured to be located in a second lower temperature zone away from the region of interest.

6. The sensor system of claim 1, wherein the passive optical filter array is configured to receive the reference pulse from a third optical fiber coupled between the first optical fiber and the second optical fiber, wherein the reference pulse provides a reference for Doppler shift.

7. The sensor system of claim 1, wherein each of the optical notch filters is operative to pass a selected frequency from a frequency spectrum to a respective one of the optical detectors.

8. The sensor system of claim 1, wherein the optical notch filters each comprise:
   a waveguide structure including a first waveguide and a second waveguide, the waveguide structure comprising:
     an input port located at a first end of the first waveguide;
     a reflection port located at a first end of the second waveguide and adjacent to the input port;
     a drop port located at an opposite second end of the first waveguide; and
     a grating-assisted directional coupler located in a central portion of the waveguide structure between the input port and the drop port, the grating-assisted directional coupler including a periodic grating structure on each of the first and second waveguides.

9. The sensor system of claim 8, wherein:
   the first waveguide is configured to receive light injected into the input port and direct the light to the grating-assisted directional coupler; and
   the periodic grating structure of the grating-assisted directional coupler is configured to produce a pi phase shift, which is an abrupt change in a spatial pattern of waveguide modulation, such that a periodic structure of the waveguide modulation is shifted in spatial phase by pi radians on either side of an interface, that generates a confined field of the light at a resonance wavelength, with the light circulating around the pi phase shift;
   wherein a selected wavelength of the light is transmitted to the drop port, and all other wavelengths of the light exit through the reflection port.

10. The sensor system of claim 1, further comprising a data processing unit coupled to an output of the signal processing chip, the data processing unit operative to determine the one or more parameters of the gas in the region of interest.

11. The sensor system of claim 1, wherein the one or more parameters of the gas in the region of interest include gas temperature, gas pressure, or gas flow rate.

12. The sensor system of claim 1, wherein the sensor system is implemented in a light detection and ranging (LiDAR) sensor system.

13. A sensor system, comprising:
a sensor chip comprising a photonics substrate;
a pulsed light source on the photonics substrate, the pulsed light source operative to emit light pulses at a selected wavelength;
a first grating coupler on the photonics substrate and in optical communication with the pulsed light source, the first grating coupler configured to couple a light pulse, transmitted from the pulsed light source, into a region of interest;
a second grating coupler on the photonics substrate, the second grating coupler configured to receive backscattered light from the region of interest; and
a passive optical filter array on the photonics substrate and in optical communication with the second grating coupler, the passive optical filter array configured to receive the backscattered light from the second grating coupler, and a reference pulse from the pulsed light source, wherein the passive optical filter array comprises:
  a plurality of optical notch filters in optical communication with each other, the optical notch filters operative for frequency selection; and
  a plurality of optical detectors each respectively coupled to an output of one of the optical notch filters;
wherein the passive optical filter array is operative to perform frequency spectrum decomposition of the received backscattered light into a plurality of signals used for data extraction and processing to determine one or more parameters of a gas in the region of interest.

14. The sensor system of claim 13, wherein:
the pulsed light source comprises a pulsed laser; and
the photonics substrate comprises a silicon photonics substrate.

15. The sensor system of claim 13, wherein each of the optical notch filters is operative to pass a selected frequency from a frequency spectrum to a respective one of the optical detectors.

16. The sensor system of claim 13, wherein the optical notch filters each comprise:
a waveguide structure including a first waveguide and a second waveguide, the waveguide structure comprising:
  an input port located at a first end of the first waveguide;
  a reflection port located at a first end of the second waveguide and adjacent to the input port;
  a drop port located at an opposite second end of the first waveguide; and
  a grating-assisted directional coupler located in a central portion of the waveguide structure between the input port and the drop port, the grating-assisted directional coupler including a periodic grating structure on each of the first and second waveguides.

17. The sensor system of claim 16, wherein:
the first waveguide is configured to receive light injected into the input port and direct the light to the grating-assisted directional coupler; and
the periodic grating structure of the grating-assisted directional coupler is configured to produce a pi phase shift, which is an abrupt change in a spatial pattern of waveguide modulation, such that a periodic structure of the waveguide modulation is shifted in spatial phase by pi radians on either side of an interface, that generates a confined field of the light at a resonance wavelength, with the light circulating around the pi phase shift;
wherein a selected wavelength of the light is transmitted to the drop port, and all other wavelengths of the light exit through the reflection port.

18. The sensor system of claim 13, further comprising a data processing unit coupled to an output of the sensor chip, the data processing unit operative to determine the one or more parameters of the gas in the region of interest.

19. The sensor system of claim 13 wherein the one or more parameters of the gas that are determined for the region of interest include gas temperature, gas pressure, or gas flow rate.

20. The sensor system of claim 13, wherein the sensor system is implemented in a light detection and ranging (LiDAR) sensor system.

* * * * *